UNITED STATES PATENT OFFICE.

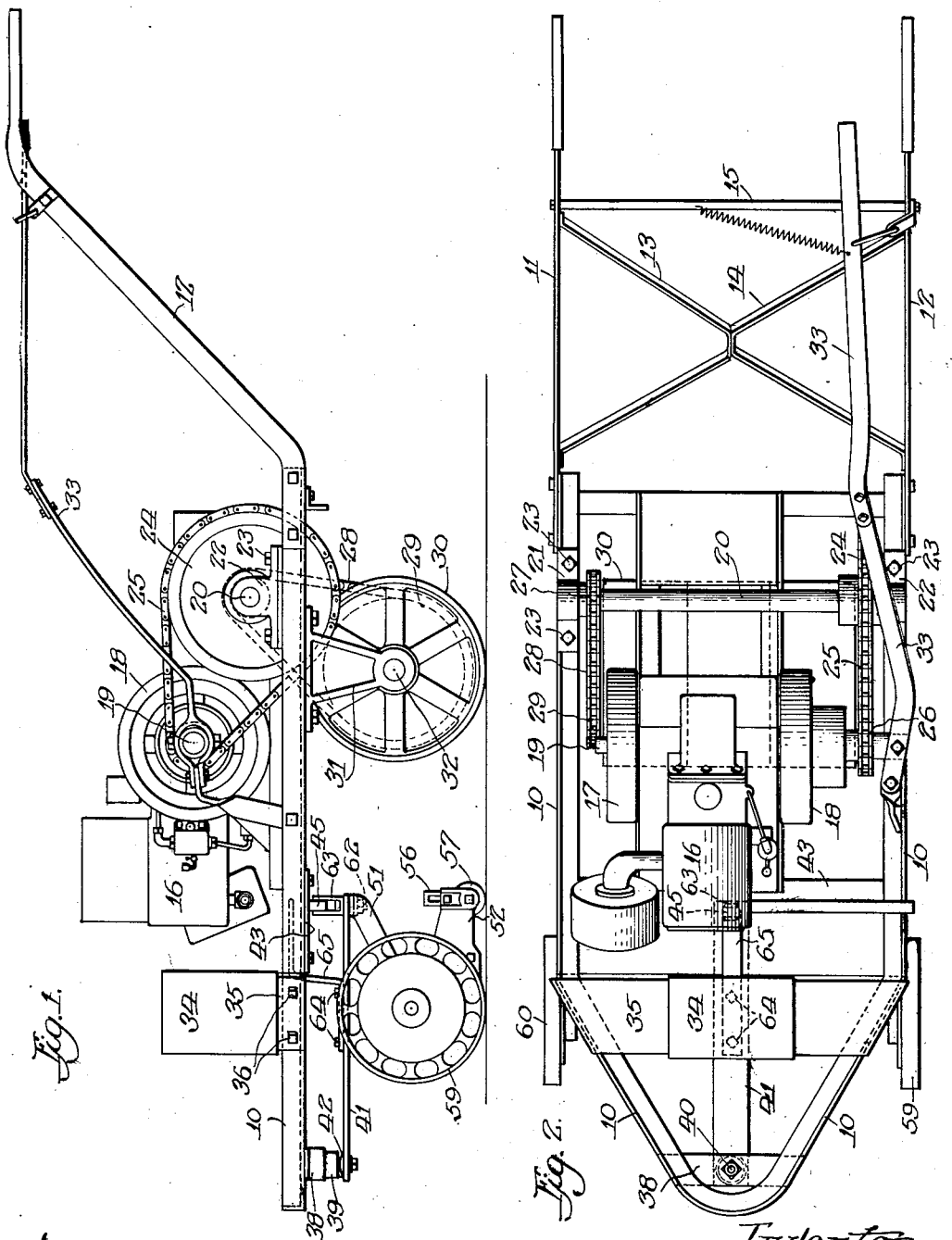

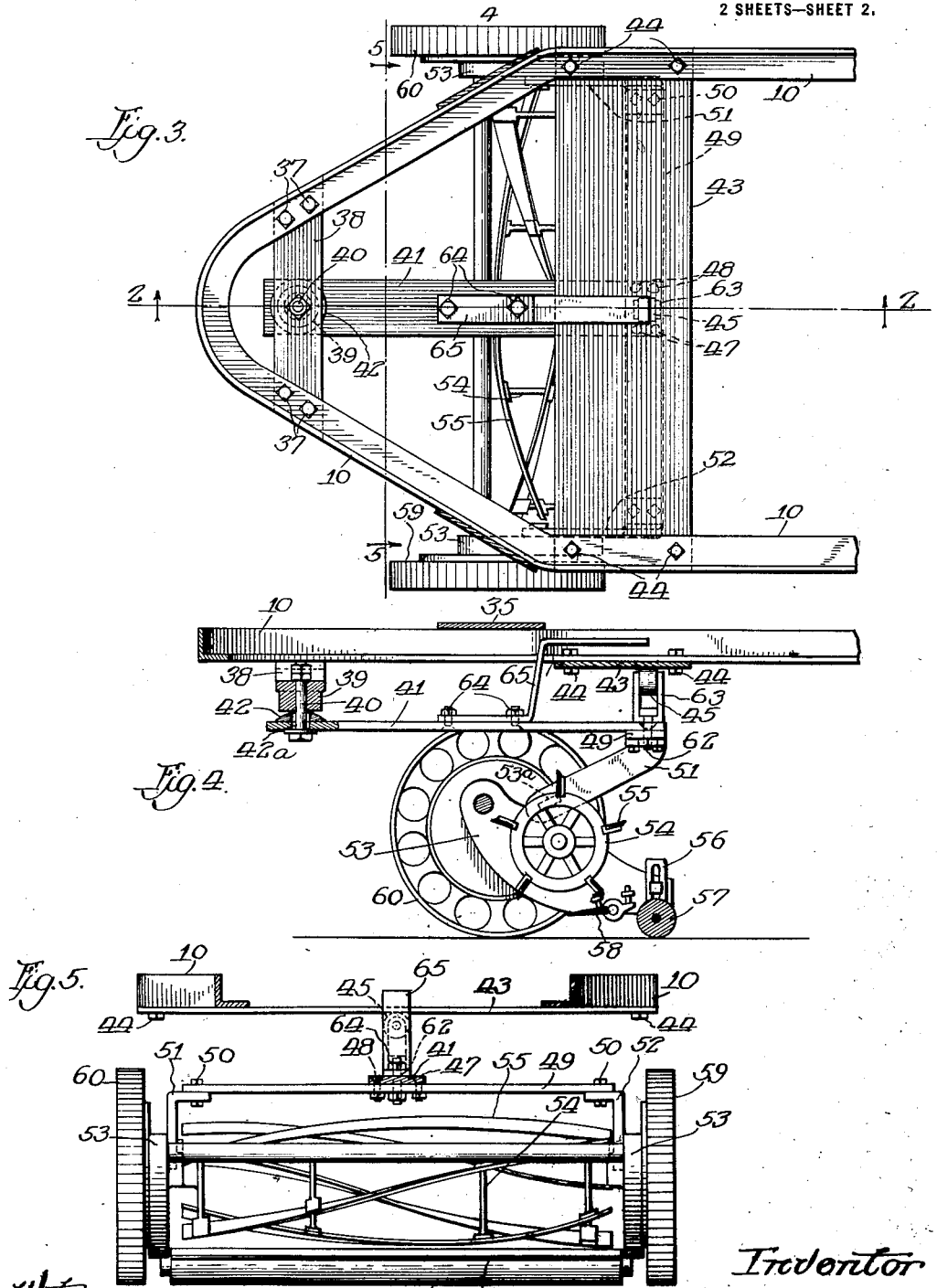

MATTHEW HOWARD REED, OF CHICAGO, ILLINOIS.

LAWN-MOWER.

1,304,372.     Specification of Letters Patent.     Patented May 20, 1919.

Application filed July 15, 1918. Serial No. 244,887.

*To all whom it may concern:*

Be it known that I, MATTHEW HOWARD REED, a citizen of the United States, residing at Chicago, in the county of Cook and State of Illinois, have invented certain new and useful Improvements in Lawn-Mowers, of which the following is a specification.

My invention relates to power driven lawn mowers, and particularly to the type in which the driving power is applied to rear wheels or rollers while the mowing mechanism is carried by a front running gear, and in which the load of the machine is supported by the front running gear as well as the rear wheels. It has been proposed to construct power driven lawn mowers having these features, but, for the purpose of steering the machine, controlling connections have been introduced between the machine and its front running gear, whereby the angle of the latter could be changed at will and the propulsion developed through the rear wheels and transmitted through the body to the front wheels made to guide the machine through means of the angle of incidence developed between the front wheels and the surface over which the machine travels. This principle of steering, while very common and satisfactory for motor driven vehicles in general, is particularly disadvantageous when applied to a lawn mower because of the destructive influence of the steering wheels upon the surface of the lawn, and this undesirable condition exists regardless of whether the front running gear is connected with an ordinary king bolt pivot arrangement or through the medium of a draft tongue which offsets the wheels rearwardly from the point at which the running gear is pivoted to the frame.

One object of the present invention is to provide a construction of power driven lawn mower which avoids the objection above referred to by avoiding the use of the front wheels in determining the direction of the machine; that is to say, by providing means for determining the direction of the machine independently of the front wheels and permitting the latter to trail or follow the new direction, and thus avoid injury to the sod or lawn surface.

Accordingly, one feature of the present invention consists in providing means whereby the machine as a whole, but independently of its front running gear, may be swung upon its rear ground wheels or rolling support (preferably in the form of a roller) to change its direction of travel, while the front running gear, which carries the mowing mechanism, is permitted to follow in assuming the new direction by trailing it from a point in advance of its point of contact with the ground and permitting it to have substantially free and unrestrained lateral movement about its towing point.

For purposes of illustration, the invention is herein disclosed as being embodied in a machine which, while supplying its own power for travel, does not carry the operator, but the latter maintains guiding control of it while walking, and the change of direction is accomplished through means of handles by which the machine may be swung horizontally upon its rear ground support (rollers or wheels) as a pivot, the forward end of the machine having a sweep from side to side which is unopposed by the front running gear, notwithstanding the latter is affording vertical support to the front end and thus receiving sufficient load to maintain in the front wheels the drive required to actuate the cutting mechanism. But it is obvious that the novel feature of this part of the invention would be appropriate to a machine in which some other means were employed for bodily changing the direction of the machine independently of its front running gear; hence, the terms of the subjoined claims and not the specific operation of the illustrative embodiment should be looked to for determining the scope of this part of the invention.

Another object of the invention is to provide a construction and organization of the front running gear with the machine which, while realizing the primary object of the invention as above explained, will be adapted at all times to sustain the proper proportion of the weight of the machine, and particularly to receive the load in a downward and forward direction which insures a more efficient traction of the wheels which impart driving power to the cutter; to which end, a second feature of the invention consists in connecting the front running gear with the frame of the machine through the medium of a forwardly extending draft member which is pivoted at its forward end to the frame while its rear portion is free to swing laterally and thus caused to trail from the frame while not restricting the lateral sweep of the frame incident to guiding the machine.

Still another object of the invention is to provide a construction of front running gear which, while realizing the objects previously stated, will have sufficient torsional resiliency in relation to the body of the machine to maintain normal relation of the cutter to the surface upon which it is operating at all times, notwithstanding unevenness in the surface over which it travels, or different angular positions to which it may swing as an incident to the steering of the machine.

With these and other objects in view, the embodiment of the invention selected for purposes of illustration will now be described in detail, and the novel features thereof particularly pointed out in the claims, reference being had in the detailed description to the accompanying drawings, in which—

Figure 1 is a side elevation of a lawn mower embodying the several features of the present invention, Fig. 2 is a top plan view of the same, Fig. 3 is a top view of the front end of the frame showing the manner of attaching the cutting element thereto, Fig. 4 is a vertical sectional view on lines 2—2 of Fig. 3, and Fig. 5 is a front elevation with parts in section on lines 5—5 of Fig. 3.

Referring now specifically to the drawings, in which like reference characters refer to like parts throughout, a frame 10 is shown with a pair of rearwardly and upwardly extending handles 11, 12, secured thereto at its rear end. The handles are strengthened by a pair of V-shaped braces 13, 14, secured to the handles at their outer ends and bolted together at their middle portions, and the handles are also further fastened by a transversely extending brace 15, secured to the handles 11 and 12 at its ends. The handles are thus well adapted to swing the machine laterally, and thus constitute means for presenting its longitudinal axis in any position and thereby determining its direction of travel. Mounted upon the frame 10 in any suitable manner is a gasolene engine 16, having the usual fly wheels 17, 18 mounted upon its crank shaft 19. Extending transversely across the rear end of the frame 10 is a shaft 20 which is journaled upon the frame by means of a pair of brackets 21, 22, which are bolted to the frame by means of bolts 23, 23. Mounted upon the transversely extending shaft 20 at one side is a large sprocket wheel 24, which is connected by a sprocket chain 25 to a sprocket wheel 26 mounted upon the crank shaft 19 of the gasolene engine. At the opposite end of the shaft 20 is a small sprocket wheel 27 having a sprocket chain 28 leading therefrom to a large sprocket wheel 29 secured to the supporting or traction roller 30, which in turn is secured to the frame 10 by a pair of downwardly extending brackets 31 on each side of the frame 10, and an axle 32 which passes through said bracket and roller, adapting the roller to serve as the rear supporting means for the frame 10 of the lawn mower as well as the traction member for driving it, and the support upon which it turns in determining its direction of travel. A lever 33 extending rearwardly to the handles from a suitable clutch mechanism upon the crank shaft 19 provides means for throwing the gasolene engine out of engagement with the sprocket wheel 26 upon the crank shaft 19. A weight box 34 which may serve as a tool box secured to a transversely extending member 35, near the forward end of the frame is adapted to receive an extra weight in order to increase the traction of the wheels of the cutter by which the forward end of the frame is supported as hereinafter described. The member 35 is secured to the frame 10 at each of its ends by means of bolts 36, 36. Secured to the forward end of the frame in any suitable manner, but preferably by bolts 37, 37, is a transversely extending member 38 to which at its central portion is secured a block 39 in any suitable manner. Secured to the transversely extending member 38, by means of a bolt 40, is a rearwardly extending draft member 41, with a washer 42 rounded upon its upper end interposed between it and the block 39. The bolt 40 passes through the block 39 and the transversely extending member 38 and through the draft member 41, the hole 42ª in the draft member 41 being slightly larger in diameter than the bolt 40 so as to allow for a slight amount of torsional motion at this connection. The rounded washer 42 also assists in maintaining the flexible connection at the point of connection of the draft member 41.

43 represents a transverse plate bridging the space between the side rails of the frame 10 to which it is secured by bolts 44 and beneath which bears the traversing roller 45 carried at the rear end of the draft member 41, and through which vertical support is afforded for the front end of the frame upon the front running gear, while permitting the frame freedom of swinging movement relatively to the latter. As the roller 45 coincides with the longitudinal axis of the front running gear and its draft member 41, about which oscillation takes place when the running gear rocks beneath the frame in traveling over uneven ground, it will be seen that the roller 45 and the convex washer 42 afford rocking bearings upon which this torsional or rocking movement will take place. And inasmuch as the roller 45 travels with and retains this relation to the longitudinal axis of the forward running gear, this freedom of rocking movement, without detracting from vertical support of the frame or hindering the swinging movement of the forward end of the frame or the free trailing movement of the front running gear, exists whatever the angular relation of the draft member 41 may be with reference to the longitudinal axis of the frame. Secured to the member 41 at its rear end, by means of a pair of bolts 47 and 48, is a transversely extending member 49 to which at each of its ends is secured by means of bolts 50, 50, a downwardly extending members 51 or 52, these members 51 and 52 being secured at their lower ends to a pair of downwardly and rearwardly extending members 53, 53, of an ordinary lawn mower by means of lugs 53ª integral with the members 53, 53, respectively, and which fit into apertures in the lower ends of the members 51, 52 respectively. These lugs 53ª are preferably rectangular in shape in cross-section and are slightly smaller than the apertures in the members 51 and 52 into which they fit, thus allowing for a certain amount of flexibility of movement between the members 53, 53 and the downwardly extending arms 51, 52. The members 53, 53 have mounted therein the usual cutter head 54 of an ordinary lawn mower, to which is secured in any suitable manner cutting blades 55. The members 53 at their rear ends also have a suitable device 56, to which is secured a small roller 57 at its lower end for adjusting the height of the cutting mechanism of the lawn mower at its rear end. A transversely extending blade 58, secured at each of its ends to the members 53, is provided in the usual manner. A pair of traction wheels 59 and 60, secured to the lawn mower and having suitable gearing for revolving the cutting head 54 in the usual manner, is provided, the lawn mower being of the usual and ordinary construction.

The roller 45 may be conveniently mounted upon the forward running gear by means of the bolt 62 and the fork 63. Secured to the member 41 near its middle portion, by means of a pair of bolts 64, is a member 65 which extends upward and then backward over the transverse member 43, the member 65 being held rigidly at its forward end and free at its rear end, so as to swing over the member 43 at a slight distance above the same, and thus limiting downward movement of the front running gear when the forward end of the frame is elevated, as, for instance, by bearing down upon the rear handles, and when it is desired to reverse the machine, or when one traction wheel of the front running gear passes over a deep depression. It will be understood that the sidewise movement of the draft member 41 at its rear end and consequently of the cutting element is limited only by the contact of the member 41 with the sides of the frame 10, thus allowing for all of the freedom of movement necessary for the easy handling of the mower in guiding the machine around trees, etc., during its operation.

It will be seen that by connecting the front running gear to the frame in the manner shown and described, I have provided a connection of such flexibility that the front running gear has no influence upon the guiding of the machine but is free to follow its point of draft as the guiding of the machine develops from other influences; that the forward running gear which constitutes the cutting element has such torsional flexibility that it is free to maintain normal relation to the surface over which it is cutting, notwithstanding lateral swinging movement between it and the frame; that notwithstanding this lateral swinging movement and the maintenance of torsional flexibility, the front end of the frame constantly receives its vertical support from, and distributes its load symmetrically through the traverse plate and roller, upon the front running gear; and that all these conditions exist without interfering with the condition of steering the machine independently of the front running gear, without interfering with the condition of developing the drive through the rear supporting roller, and without interfering with the action of the front supporting wheels in developing the drive of the cutting element.

I have found this organization of the members more satisfactory than when the cutter is geared directly to the engine and operated therefrom, because in the latter arrangement obstructions which are likely to be met with would stop the operation of the cutter or the engine, and result in breaking the machine, whereas in the present construction, the traction wheels when the cutting mower is obstructed, will slide along on the ground and no damage will be done to the machine.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

What I claim is:

1. A mowing machine having front and rear ground supports upon which it travels, with means for imparting a bodily swinging movement to the machine horizontally upon its rear supports for directing its course of travel; the front ground support carrying cutting means and having a freely trailing connection with the machine.

2. In a mowing machine having a ground support upon which it travels and upon which the machine swings bodily in steering, a cutting element having a freely trailing connection with the machine forward of said ground support, and means independent of said cutting element for steering the machine.

3. A mowing machine having a ground support upon which it travels and upon which it may swing bodily in directing its course of travel, and a cutting element having ground wheels by which it is actuated, said cutting element being secured to the forward portion of the machine by a connection which permits freedom of trailing movement in the cutting element and a steering movement of the machine independently of said cutting element.

4. A mowing machine having a ground support upon which it travels and with which it may swing bodily in directing its course of travel, and a cutting element having an unrestrained trailing connection with the machine which permits freedom of lateral movement of the cutting element and which is torsional to maintain the cutting element in normal relation to the surface over which it travels.

5. A mowing machine having a ground support upon which it travels and with which it moves bodily in directing its course of travel, and a cutting element having ground wheels by which the cutting action is developed from its travel over the surface to be cut, said cutting element having a trailing connection with the machine which permits the machine to change its course independently of the cutting element, and having a traversing support through which it sustains the forward end of the machine when at different angles to the machine.

6. In a mowing machine, the combination of a frame, a ground support upon which the frame travels and with which it swings bodily in directing the course of travel of the machine, a traverse plate carried by said frame, a front running gear carrying a cutter and ground wheels for driving the same, a trailing connection between the front running gear and the frame, and a support on the front running gear receiving the traverse plate on the frame and located in the longitudinal axis of the trailing connection.

7. In a power driven mowing machine having a ground support upon which it travels and with which it swings bodily in determining the direction of travel of the machine, a power plant adapted to revolve said ground support to drive the machine, means for imparting the bodily swinging movement to the machine upon said ground support, and a cutting element drawn by the forward end of the machine having a freely trailing connection with the machine.

8. In a power driven mowing machine, the combination of a frame, a cutting element connected with the forward portion of said frame through means which permits a free trailing movement of said cutting element, a ground support for said frame in rear of said cutting element, means for imparting a bodily swinging movement to the machine upon its ground support, independently of the cutting element, and a power plant adapted to impart propelling movement to the rear ground support.

9. In a power driven mowing machine, the combination of a frame, a cutting element connected with the forward portion of said frame through means which permits a free trailing movement of said cutting element, a ground support for said frame in rear of said cutting element, means for imparting a bodily swinging movement to the machine upon its ground support, independently of the cutting element, and a power plant adapted to impart propelling movement to said ground support; said cutting element developing its cutting action by its progress over the ground.

10. In a mowing machine, a cutting element, and a connection between the cutting element and the machine comprising a draft member having a torsionally and laterally flexible connection at its forward end with the machine and having its rear end connected with the cutting element to tow the same with freedom to swing and rock beneath the machine; said draft member carrying at its said rear end, in line with its axis of torsional movement and traveling laterally with said free end, a vertical support for the machine.

11. In a mowing machine, a cutting element having a torsionally and laterally flexible connection to the forward end of the machine and standing in freely trailing relation to the machine; means being provided to limit downward movement of the cutting element relatively to the machine in the absence of support beneath either side of the cutting element.

12. In a mowing machine, a frame, a cutting element having a torsionally and laterally flexible connection with the frame, offset rearwardly from said connection and maintained in freely trailing relation thereto; said cutting element having in the plane of the axis of its torsional flexibility a vertical support for the frame which support travels with the cutting mower in its trailing movements, and also having in the plane of said axis, but freely moving with the cutting element, means for limiting downward movement of the cutting mower relatively to the frame.

Signed at Chicago, Illinois, this 2nd day of July, 1918.

MATTHEW HOWARD REED.